US011929246B2

(12) United States Patent
Dziekonski

(10) Patent No.: US 11,929,246 B2
(45) Date of Patent: Mar. 12, 2024

(54) PHASE LOCKED FOURIER TRANSFORM LINEAR ION TRAP MASS SPECTROMETRY

(71) Applicant: DH TECHNOLOGIES DEVELOPMENT PTE. LTD., Singapore (SG)

(72) Inventor: Eric T Dziekonski, Lafayette, IN (US)

(73) Assignee: DH Technologies Development Pte. Ltd., Singapore (SG)

( * ) Notice: Subject to any disclaimer, the term of this patent is extended or adjusted under 35 U.S.C. 154(b) by 291 days.

(21) Appl. No.: 17/427,386

(22) PCT Filed: Jan. 28, 2020

(86) PCT No.: PCT/IB2020/050658
§ 371 (c)(1),
(2) Date: Jul. 30, 2021

(87) PCT Pub. No.: WO2020/157656
PCT Pub. Date: Aug. 6, 2020

(65) Prior Publication Data

US 2022/0102133 A1 Mar. 31, 2022

Related U.S. Application Data

(60) Provisional application No. 62/800,383, filed on Feb. 1, 2019.

(51) Int. Cl.
*H01J 49/42* (2006.01)
*H01J 49/38* (2006.01)

(52) U.S. Cl.
CPC ............ *H01J 49/422* (2013.01); *H01J 49/38* (2013.01)

(58) Field of Classification Search
CPC ................................ H01J 49/422; H01J 49/38
See application file for complete search history.

(56) References Cited

U.S. PATENT DOCUMENTS

| | | | |
|---|---|---|---|
| 6,177,668 | B1 | 1/2001 | Hager |
| 2004/0026613 | A1 | 2/2004 | Bateman |

FOREIGN PATENT DOCUMENTS

| | | | |
|---|---|---|---|
| GB | 2395355 | A | 5/2004 |
| WO | 2012150351 | A1 | 11/2012 |

OTHER PUBLICATIONS

International Search Report and Written Opinion for PCT/IB2020/050658 dated Jan. 28, 2020.

*Primary Examiner* — Nicole M Ippolito
*Assistant Examiner* — Hanway Chang

(57) ABSTRACT

In one aspect, a mass analyzer is disclosed, which comprises a quadrupole having an input end for receiving ions and an output end through which ions can exit the quadrupole, said quadrupole having a plurality of rods to at least some of which a drive RF signal and an excitation signal can be applied. A fixed phase relationship is maintained between the drive RF signal and the excitation signal, thereby enhancing the signal-to-noise ratio of the mass detection signal.

20 Claims, 17 Drawing Sheets

PHASE LOCKED FOURIER TRANSFORM LINEAR ION TRAP MASS SPECTROMETRY

RELATED APPLICATION

This application claims priority to U.S. provisional application No. 62/800,383 filed on Feb. 1, 2019, entitled "Phase Locked Fourier Transform Linear Ion Trap Mass Spectrometry," which is incorporated herein by reference in its entirety.

BACKGROUND

The present invention relates generally to systems and methods for mass spectrometry, and particularly, to such systems and methods that can be used in a Fourier transform mass spectrometer.

Mass spectrometry (MS) is an analytical technique for determining the elemental composition of test substances with both quantitative and qualitative applications. For example, MS can be used to identify unknown compounds, to determine the isotopic composition of elements in a molecule, and to determine the structure of a particular compound by observing it fragmentation, as well as to quantify the amount of a particular compound in a sample.

In some mass spectrometers, linear ion traps are employed, for example, to achieve collisional dissociation of ions. One technique for ejecting ions from a linear ion trap is known as mass selective axial ejection (MSAE) in which an excitation signal is employed to cause radial excitation of the ions in vicinity of the output end of the ion trap, where the radially-excited ions interact with fringing fields at the vicinity of the output end as they exit the trap such that their radial oscillations are converted into axial oscillations. A detector positioned downstream of the ion trap can detect the ions and generate a time-varying ion detection signal whose Fourier transform can provide a mass spectrum of the detected ions.

The time at which the ions can be preferentially ejected from the ion trap via MSAE can, however, vary from one scan to another, thus leading to lower average signal intensity as well as the loss of information regarding micromotion of the ions caused by conversion of their radial motion into axial motion via fringing fields in proximity of the output end of the ion trap.

Accordingly, there is a need for improved Fourier transform mass spectrometers.

SUMMARY

In one aspect, a mass analyzer is disclosed, which comprises a quadrupole having an input end for receiving ions and an output end through which ions can exit the quadrupole, said quadrupole having a plurality of rods to at least some of which an RF voltage can be applied for generating a quadrupolar field for causing radial confinement of the ions as they propagate through the quadrupole and further generating fringing fields in proximity of said output end, at least one voltage source for applying said RF confinement voltage to said rods, said at least one voltage source further being configured for applying an excitation signal to at least one of said rods for exciting radial oscillations of at least a portion of the ions passing through the quadrupole at secular frequencies thereof, wherein the radially-excited ions interact with the fringing fields to exit the quadrupole such that their radial oscillations are converted into axial oscillations, and a detector for detecting said ions exiting the quadrupole in response to a data acquisition trigger provided by said at least one voltage source. The mass analyzer can further include a controller in communication with said at least one voltage source to configure said at least one voltage source such that phases of said RF confinement voltage, said excitation signal and said data acquisition trigger signal are locked relative to one another.

In some embodiments, the excitation voltage signal and the data acquisition trigger signal are applied substantially concurrently to the rod(s) of the quadrupole and the detector, respectively.

The detector can generate a time-varying signal in response to the detection of the ions released from the quadrupole rod set. An analysis module can be employed to receive the time-varying detection signal generated by the detector in response to the detection of the ions. The analysis module can operate on the detection signal to generate a mass spectrum of the ions. For example, the analysis module can obtain a Fourier transform of the detection signal to generate a frequency domain signal and can employ the frequency domain signal to generate a mass spectrum of the ions.

In some embodiments, the RF confinement voltage can have a frequency in a range of about 50 kHz to about 10 MHz, e.g., in a range of about 1 MHz to about 5 MHz. Further, in some embodiments, the RF confinement voltage can have an amplitude in a range of about 50 V to about 10 kV.

The quadrupole rod set can include four rods that are arranged so as to generate a quadrupolar field in response to application of the RF confinement voltage thereto. In some embodiments, the plurality of rods can include at least a pair of auxiliary electrodes. In some such embodiments, said at least one voltage source can apply an excitation signal across said pair of auxiliary electrodes for radially exciting the ions in order to facilitate their exit from the quadrupole rod set.

In some embodiments, said at least one voltage source can include an RF voltage source for applying the RF confinement voltage (herein also referred to as "drive RF voltage" or "drive RF signal") to one or more of the quadrupole rods and a pulsed excitation voltage source for applying an excitation signal for application to at least one of the quadrupole rods and a detection trigger signal for application to the detector.

In some embodiments, the quadrupole rod set is a linear ion trap (LIT). In some such embodiments, the linear ion trap can include an inlet lens disposed in proximity of its input port to facilitate entry of ions into the ion trap and an exit lens disposed in proximity of the output port to facilitate the exit of the ions from the linear ion trap. The mass analyzer can include a voltage source configured to apply a DC voltage to the input lens to attract the incoming ions into the linear ion trap and a DC voltage to the exit lens to adjust the fringing fields in proximity of the output port of the linear ion trap, e.g., to facilitate the exit of the ions from the linear ion trap.

In another embodiment, a method of performing mass analysis is disclosed, which includes passing a plurality of ions through a quadrupole rod set (e.g., a linear ion trap (LIT)) comprising a plurality of rods, said quadrupole rod set comprising an input end for receiving the ions and an output end through which ions exit the quadrupole, applying at least one drive RF signal to at least one of said rods so as to generate a field for radial confinement of the ions as they pass through the quadrupole, applying an excitation voltage pulse across at least one pair of said plurality of rods so as to excite radial oscillations of at least a portion of the ions passing through the quadrupole at secular frequencies thereof such that an interaction between said excited ions with fringing fields in proximity of said output end facilitates exit of said excited ions through said output end and converts said radial oscillations into axial oscillations as said excited ions exit the quadrupole set, wherein said drive RF signal is phased locked relative to said excitation voltage pulse.

A detector can be used to detect the ions exiting the quadrupole, where the detector can generate a time-varying ion detection signal in response to the detection of the incident ions. A data acquisition trigger signal can be applied to the detector to initiate acquisition of ion detection signal. The data acquisition signal can be phase locked relative to the drive RF signal and the ion excitation signal. As discussed in more detail below, such phase locking of these signals can result in an improved signal-to-noise ratio of the mass detection signal. A Fourier transform of the time-varying ion detection signal generated by the detector can result in a frequency-domain signal, which can be utilized to generate a mass spectrum associated with the detected ions.

In another aspect, a method of obtaining mass detection signals in a mass spectrometer is disclosed, which comprises applying a drive RF signal to at least one rod of a quadrupole rod set for each of a plurality of scans for collecting mass signals of a plurality of ions; recording phase of the drive RF signal at the beginning of each scan; for each scan, obtaining transient ion detection signal; adjusting phase of each transient ion detection signal obtained in each scan based on the recorded phase of the drive RF signal for that scan such that all transient ion detections signals corresponding to said plurality of scans have substantially the same phase. Such transient signals can then be averaged to obtain an average signal.

Further understanding of various aspects of the invention an be obtained with reference to the following detailed description in conjunction with the associated drawings, which are described briefly below.

DETAILED DESCRIPTION

In one aspect, the present teachings provide an improved Fourier transform mass analyzer in which the drive RF signal, the mass excitation signal and the detection trigger signal are phase locked relative to one another, thereby increasing signal-to-noise ratio of mass detection signal. In some embodiments, such a mass analyzer can include a quadrupole rod set and optionally a plurality of auxiliary electrodes. An RF voltage can be applied to at least one of the rods to generate a quadrupolar field for radial confinement of ions as they propagate through the quadrupole rod set and further generating fringing fields in the vicinity of the output end. An excitation voltage applied to at least one of the rods of the quadrupole rod set can cause a radial excitation of at least a portion of the ions passing through the quadrupole. The interaction of the radially excited ions with the fringing fields in the vicinity of the output end of the quadrupole rod set can convert radial oscillations of at least a portion of the excited ions into axial oscillations. The axially oscillating ions can be detected by a detector, in response to a data acquisition trigger signal, to generate a time-varying ion detection signal. A mass spectrum of the detected ions can be calculated based on the Fourier transform of the time-varying ion detection signal. As discussed in more detail below, the RF confinement voltage, the excitation voltage and the data acquisition trigger signal are phased locked relative to one another. Such phase locking of these signals can enhance a combined mass detection signal obtained by averaging mass detection signals obtained over a number of scan cycles and can further preserve information regarding the micromotion of the ions. Although various embodiment are discussed below with reference to quadrupole rod sets, the present teachings can be applied to other rod sets, such as hexapole and octapole rod sets.

Various terms are used herein consistent with their common meanings in the art. The term "radial" is used herein to refer to a direction with a plane perpendicular to the axial dimension of the quadrupole rod set (e.g., along z-direction in FIG. 1A). The terms "radial excitation" and "radial oscillations" refer, respectively, to excitations and oscillations in a radial direction. The term "about" as used herein to modify a numerical value is intended to denote a variation of at most 5 percent about the numerical value.

Figure 1A:
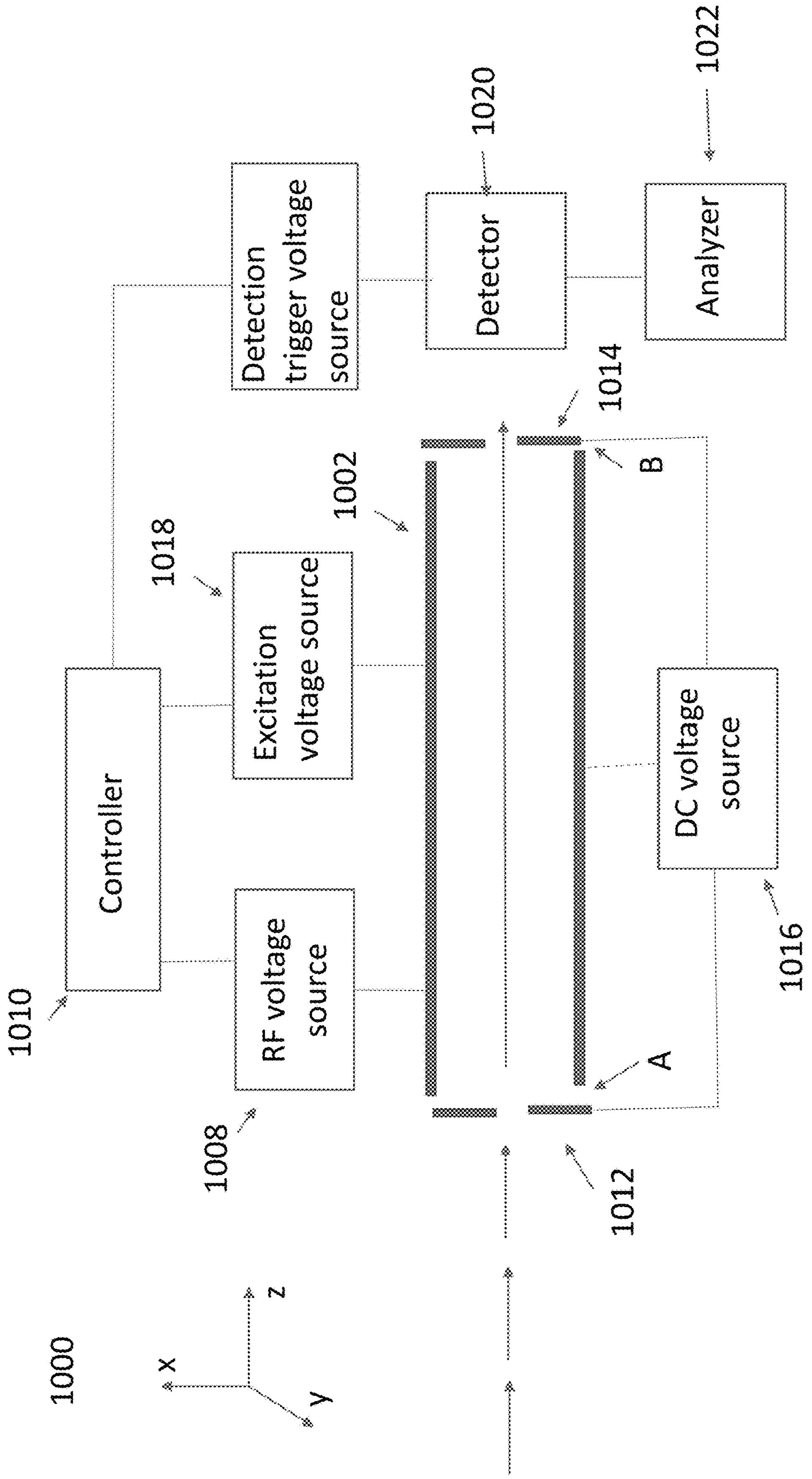
FIG. 1A schematically depicts a mass analyzer according to an embodiment of the present teachings.
Figure 1B:
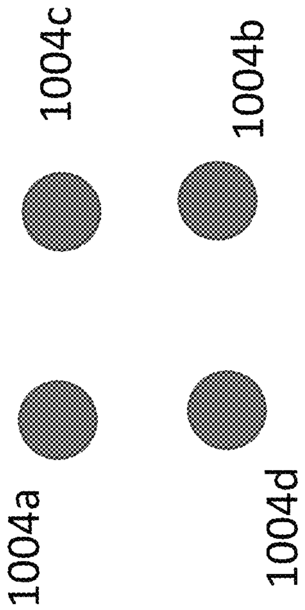
FIG. 1B is a schematic end view of the quadrupole rod sets of the mass analyzer depicted in FIG. 1A, FIG. 2 schematically depicts a square voltage pulse suitable for use in some embodiments of a mass analyzer according to the present teachings, FIG. 3 schematically depicts a phase lock circuitry suitable for use in an embodiment of the present teachings, FIG. 4 schematically depicts how a mass scan is initiated in an embodiment of the present teachings, FIG. 5 schematically depicts the relative timing of ion injection, cooling, excitation and detection with respect to an start scan function, and further depicts an example of a drive RF voltage, FIG. 6 schematically depicts an example of an implementation of an analysis module and/or a controller according to an embodiment of the present teachings.

FIGS. 1A and 1B schematically depict a mass analyzer 1000 according to an embodiment of the present teachings, which includes a quadrupole rod set 1002 that extends from an input end (A) (herein also referred to as "input port") configured for receiving ions to an output end (B) (herein also referred to as "output port") through which ions can exit the quadrupole rod set. In this embodiment, the quadrupole rod set includes four rods 1004*a*, 1004*b*, 1004*c*, and 1004*d* (herein collectively referred to as quadrupole rods 1004), which are arranged relative to one another to provide a passageway through which ions received by the quadrupole rod set can propagate from the input end (A) to the output end (B). In this embodiment, the quadrupole rods 1004 have a circular cross-sectional shape while in other embodiments they can have a different cross-sectional shape, such as hyperbolic.

The mass analyzer 1000 can receive ions, e.g., a continuous stream of ions, generated by an ion source 1001. A variety of different types of ion sources can be employed. Some suitable examples include, without limitation, an electrospray ionization device, a nebulizer assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ion source, DESI, among others.

In some embodiments, the pressure within the quadrupole rod set can be maintained in a range of about $1\times10^{-6}$ torr to about $1.5\times10^{-3}$ torr, e.g., in a range of about $8\times10^{-6}$ torr to about $5\times10^{-4}$ torr.

In this embodiment, the mass analyzer 1000 further includes an input lens 1012 disposed in proximity of the input end of the quadrupole rod set and an output lens 1014 disposed in proximity of the output end of the quadrupole rod set. A DC voltage source 1016, operating under the control of a controller 1010, can apply two DC voltages, e.g., in a range of about 1 to 50 V attractive relative a DC offset, if any, of the quadrupole, to the input lens 1012 and the output lens 1014. In some embodiments, the DC voltage applied to the input lens 1012 cause the generation of an electric field that facilitates the entry of the ions into the mass analyzer. Further, the application of a DC voltage to the output lens 1014 can facilitate the exit of the ions from the quadrupole rod set.

A radio frequency (RF) voltage source 1008 operating under the control of the controller 1010 can apply drive RF voltage(s) to at least one of the rods of the quadrupole rod set to generate a quadrupolar electromagnetic field within the volume circumscribed by the quadrupole rod set for radial confinement of the ions as they pass through the quadrupole. The RF voltage(s) can be applied to the rods with or without a selectable amount of a resolving DC voltage applied concurrently to one or more of the quadrupole rods.

In some embodiments, the RF voltages applied to the quadrupole rods 1004 can have a frequency in a range of about 0.8 MHz to about 3 MHz and an amplitude in a range of about 100 volts to about 1500 volts, though other frequencies and amplitudes can also be employed.

As noted above, the application of the RF voltages can result in the generation of a quadrupolar field within the quadrupole characterized by fringing fields in the vicinity of the input and output ends of the quadrupole rod set. As discussed in more detail below such fringing fields can couple the radial and axial motions of the ions. By way of example, the diminution of the quadrupole potential in the regions in the proximity of the output end (B) of the quadrupole rod set can result in the generation of fringing fields, which can exhibit a component along the longitudinal direction of the quadrupole (along the z-direction). In some embodiments, the amplitude of this electric field can increase as a function of increasing radial distance from the center of the quadrupole rod set.

By way of illustration and without being limited to any particular theory, the application of the RF voltage(s) to the quadrupole rods can result in the generation of a two-dimensional quadrupole potential as defined in the following relation:

$$\varphi_{2D} = \varphi_0 \frac{x^2 - y^2}{r_0^2} \qquad \text{Eq. (1)}$$

where, $\varphi_0$ represents the electric potential measured with respect to the ground, and x and y represent the Cartesian coordinates defining a plane perpendicular to the direction of the propagation of the ions (i.e., perpendicular to the z-direction). The electromagnetic field generated by the above potential can be calculated by obtaining a spatial gradient of the potential.

Again without being limited to any particular theory, to a first approximation, the potential associated with the fringing fields in the vicinity of the input and the output ends of the quadrupole may be characterized by the diminution of the two-dimensional quadrupole potential in the vicinity of the input and the output ends of the quadrupole by a function f(z) as indicated below:

$$\varphi_{FF} = \varphi_{2D} f(z) \qquad \text{Eq. (2)}$$

where, $\varphi_{FF}$ denotes the potential associated with the fringing fields and $\varphi_{2D}$ represents the two-dimensional quadrupole potential discussed above. The axial component of the fringing electric field ($E_{z,quad}$) due to the diminution of the two-dimensional quadrupole field can be described as follows:

$$E_{z,quad} = -\varphi_{2D} \frac{\partial f(z)}{\partial z} \qquad \text{Eq. (3)}$$

As discussed in more detail below, such a fringing field allows converting radial oscillations of ions excited via application of a voltage pulse to one or more of the quadrupole rods (and/or one or more auxiliary electrodes) to axial oscillations, where the axially oscillating ions are detected by a detector.

With continued reference to FIGS. 1A and 1B, the quadrupole rod set 1000 further includes an excitation pulsed voltage source 1018 operating under control of the controller 1010 for applying an excitation voltage to at least one of the quadrupole rods 1004. In this embodiment, the excitation pulsed voltage source 1018 applies a dipolar pulsed voltage to the rods 1004*a* and 1004*b*, though in other embodiments, the dipolar pulsed voltage can be applied to the rods 1004*c* and 1004*d*. In some embodiments, the amplitude of the applied pulsed voltage can be, for example, in a range of about 10 volts to about 40 volts, or in a range of about 20 volts to about 30 volts, though other amplitudes can also be used. Further, the duration of the pulsed voltage (pulse width) can be, for example, in a range of about 10 nanoseconds (ns) to about 1 millisecond, e.g., in a range of about 1 microsecond to about 100 microseconds, or in a range of about 5 microseconds to about 50 microseconds, or in a range of about 10 microseconds to about 40 microseconds, though other pulse durations can also be used. In general, a variety of pulse amplitudes and durations can be employed. In many embodiments, the longer is the pulse width, the smaller is the pulse amplitude. Ions passing through the quadrupole are normally exposed to only a single excitation pulse. Once the "slug" of excited ions pass through the quadrupole, an additional excitation pulse is triggered. This normally occurs every 1 to 2 ms, so that about 500 to 1000 data acquisition periods are collected each second.

Figure 2:
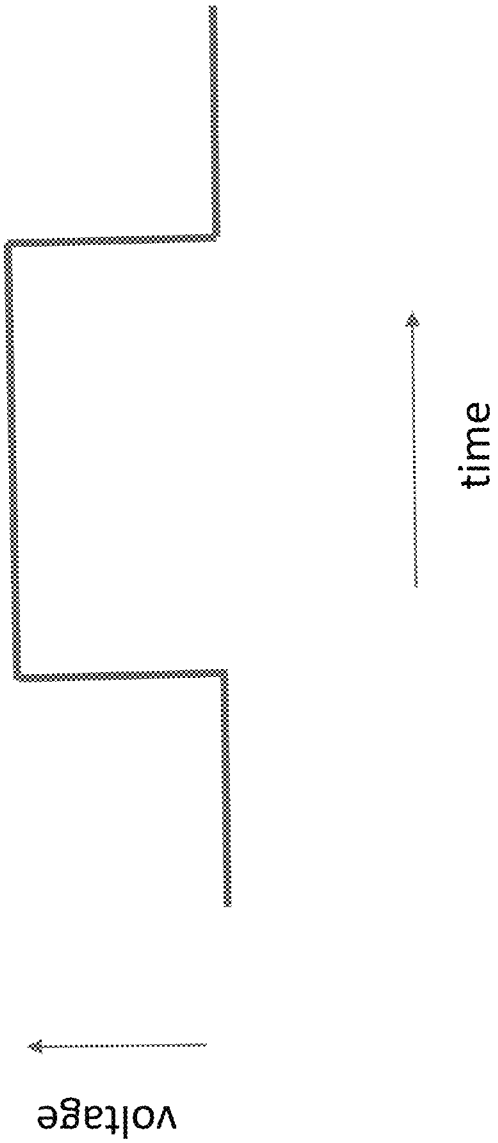

The waveform associated with the voltage pulse can have a variety of different shapes with the goal of providing a rapid broadband excitation signal. By way of example, FIG. 2 schematically shows an exemplary voltage pulse having a square temporal shape. In some embodiments, the rise time of the voltage pulse, i.e., the time duration that it takes for the voltage pulse to increase from zero voltage to reach its maximum value, can be, for example, in a range of about 1 to 100 nsec. In other embodiments, the voltage pulse can have a different temporal shape.

Without being limited to any particular theory, the application of the voltage pulse, e.g., across two diagonally opposed quadrupole rods, generates a transient electric field within the quadrupole. The exposure of the ions within the quadrupole to this transient electric field can radially excite at least some of those ions at their secular frequencies. Such excitation can encompass ions having different mass-to-charge (m/z) ratios. In other words, the use of an excitation voltage pulse having a short temporal duration can provide a broadband radial excitation of the ions within the quadrupole.

As the radially excited ions reach the end portion of the quadrupole rod set in the vicinity of the output end (B), they will interact with the exit fringing fields. Again, without being limited to any particular theory, such an interaction can convert the radial oscillations of at least a portion of the excited ions into axial oscillations.

With continued reference to FIG. 1A, in this embodiment, the controller controls the timing of the RF voltage source as well as the pulsed excitation voltage source such that the RF drive signal applied to one or more of the quadrupole rods and the excitation signal are phase locked. Such phase-locking of the RF drive signal with the excitation signal ensures that the time at which ions are preferentially ejected from the quadrupole rod set, corresponding to the maxima of the RF induced micromotion, remains substantially unchanged from one scan to another. This can in turn enhance the signal-to-noise ratio of the ion detection signal.

The axially oscillating ions leave the quadrupole rod set via an opening in the exit lens 1014 to reach a detector 1020. A voltage source 1019 operating under control of the controller 1010 applies a data acquisition trigger voltage to the detector 1020 to initiate the detection of ions by the detector. In some embodiments, rather than utilizing a separate voltage source, the excitation voltage source 1018 can further provide the data acquisition trigger voltage to the detector 1020. The controller controls the voltage source 1019, and particularly, the timing of the application of the data acquisition trigger voltage to the detector 1020, so as to ensure that the trigger voltage source is phase locked relative to the RF voltage source as well as the excitation voltage source. In other words, in this embodiment, the phases of the RF voltage for radially confining the ions, the excitation voltage and the data acquisition trigger voltage are locked relative to one another. In some embodiments, the ion excitation and detection are triggered substantially concurrently.

By phase locking the drive RF voltage and the excitation/detection voltages, the times at which ions are preferentially ejected from the quadrupole rod set become consistent from scan to scan and hence the signal amplitude increases. Further, such phase locking of the signals can advantageously preserve the high frequency oscillations in the detected signal, due to the micromotions of the ions, which would be otherwise averaged out over the course of many scans.

Figure 3:
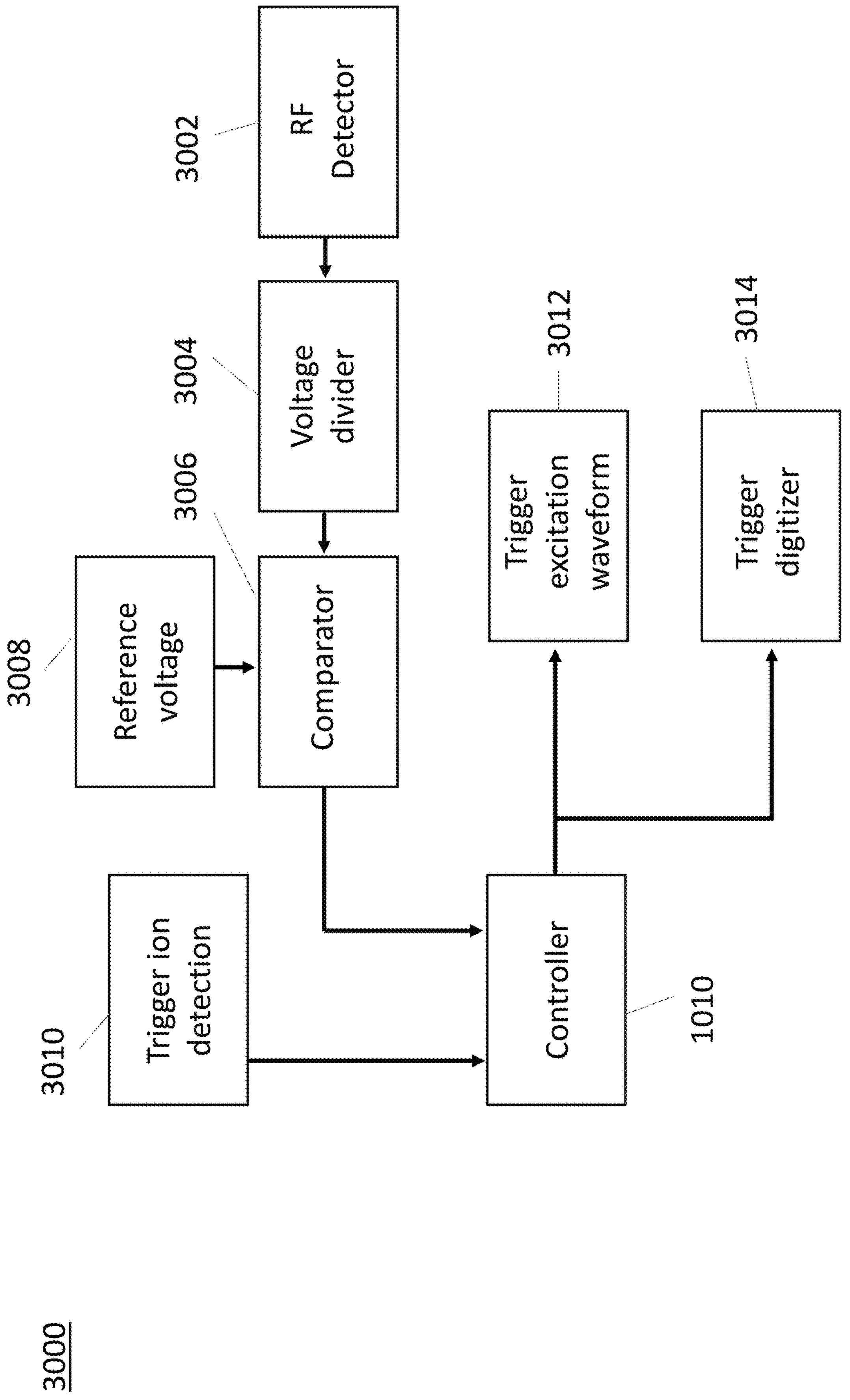

A phase lock circuitry employed by the controller 1010 can be implemented in a variety of different ways. By way of example, FIG. 3 schematically depicts an example of implementation of such a phase lock circuitry 3000. In this example, the RF drive voltage is continuously applied to the quadrupole rod(s), and an RF detector 3002 samples the RF drive voltage, and provides the sampled voltage to a voltage divider 3004. The output of the voltage divider 3004 is applied to an input port of a comparator 3006. A reference voltage source 3008 applies a reference voltage to the other input port of the comparator. The comparator will output a pulse train at the same frequency as that of the RF voltage. The duty cycle and the phase of the RF voltage at which the comparator triggers the controller 1010 are controlled by the reference voltage. When ion detection is to be initiated, a circuit 3010 applies an ion detection trigger to the controller. On the next transition of the comparator output (e.g., low-to-high or high-to-low), the controller applies an output trigger to the ion excitation voltage source 3012 and a digitizer 3014, which receives ion detection signals from the detector and digitizes the signal. In some embodiments, the controller can delay the timing of its output trigger relative to the comparator's output so as to alter the triggering of the ion excitation and detection relative to the phase of the RF voltage.

Figure 4:
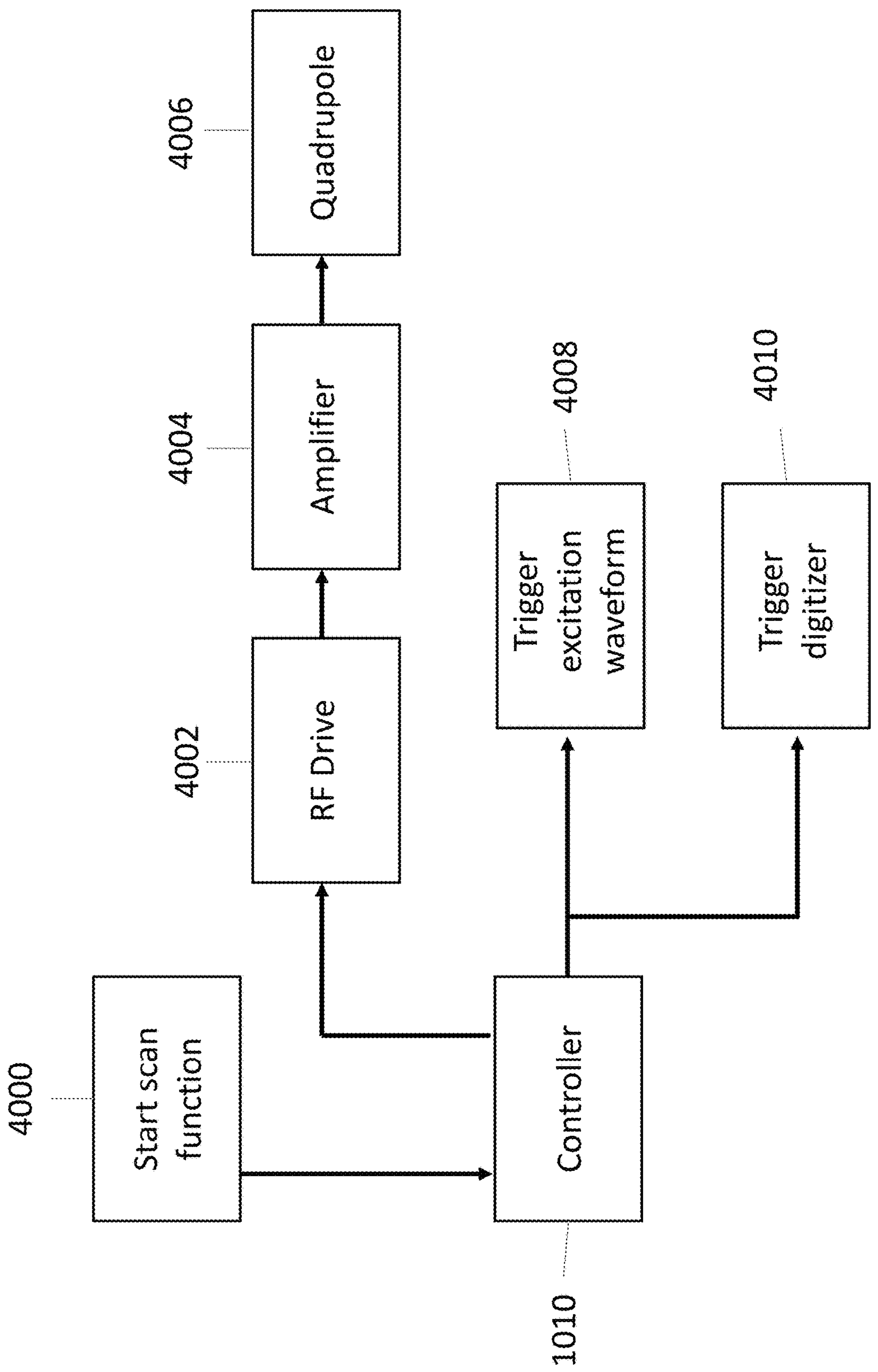
Figure 5:
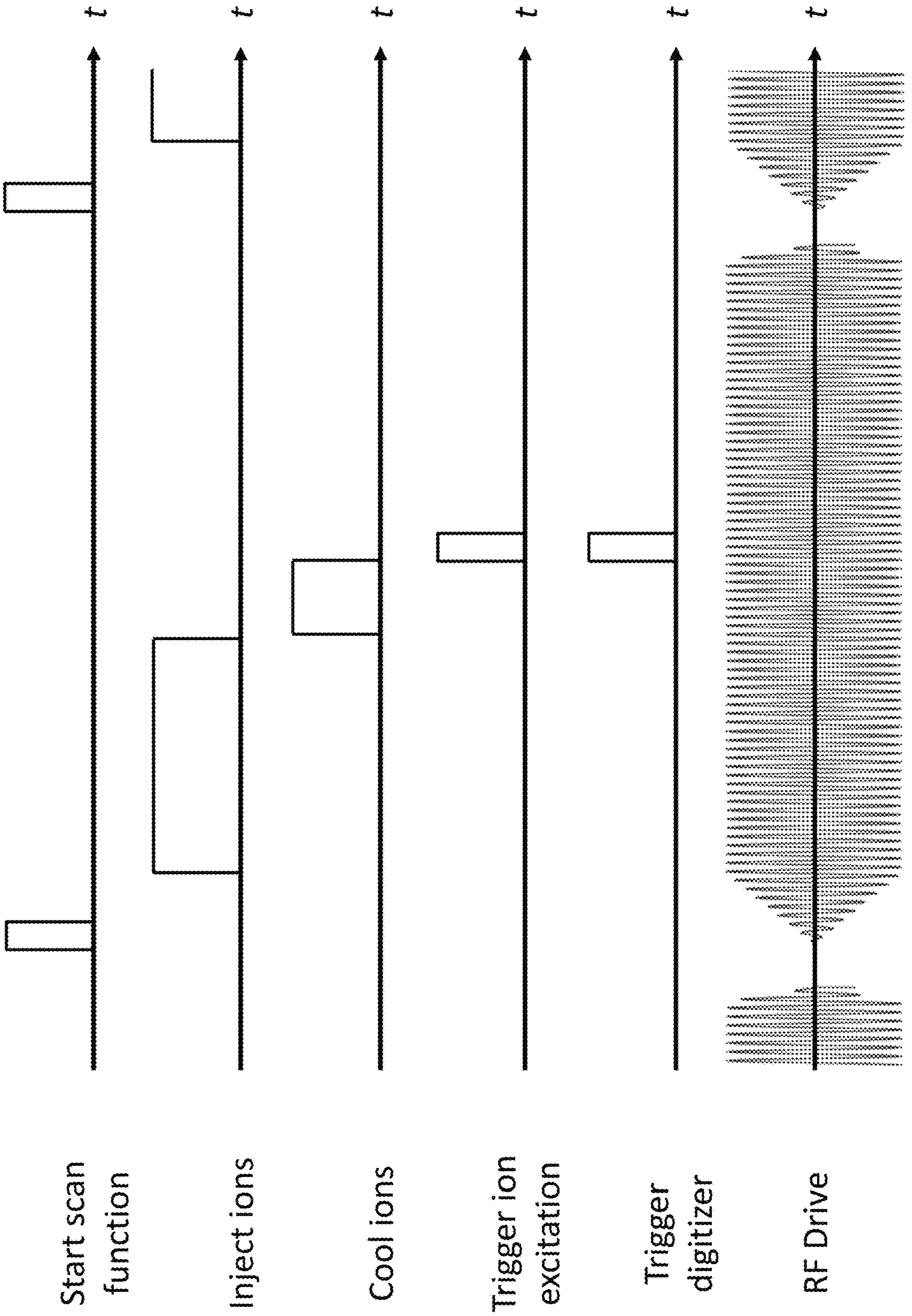

With reference to FIGS. 4 and 5, in some embodiments, in use, a start scan function 4000 can apply a trigger to the controller 1010 to initiate a new scan. The controller 1010 can in turn initiate an RF drive source 4002 to apply an RF voltage to the amplifier 4004, which in turn applies an amplified RF drive voltage to one or more rods of a quadrupole rod set 4006 of a linear ion trap. The controller further initiates the injection of ions into a linear ion trap. In this embodiment, the injection of the ions into the linear ion trap is achieved with a time delay relative to the start scan trigger. The ions undergo collisional cooling within the ion trap. With a delay relative to the start of the scan dictated by the phase of the RF voltage at which the application of the excitation voltage to one or more rods of the quadrupole rod set is desired, the controller initiates the application of an excitation trigger to the excitation voltage source 4008, which in turn applies an excitation signal to the quadrupole rod(s). Further, concurrently with the application of a data acquisition trigger to the detector, the controller applies a data acquisition trigger to a digitizer 4010 to initiate the collection of ion detection signal(s).

As shown in FIG. 5, in this embodiment, the RF drive signal (A) is terminated within a predefined time (e.g., 100 microseconds) relative to the end of the scan and is applied again upon initiation of the next scan. By adjusting the timing of the ion excitation signal and the data acquisition signal relative to the RF drive signal, the controller ensures that for each scan the ion excitation and the data acquisition signals are phase locked relative to the RF drive signal, e.g., in a manner discussed above.

Referring again to FIG. 1A, the detector 1020 operating under control of the controller 1010 generates a time-varying ion signal in response to the detection of the ions. A variety of detectors can be employed. Some examples of suitable detectors include, without limitation, Photonics Channeltron Model 4822C and ETP electron multiplier Model AF610.

An analyzer 1022 (herein also referred to as an analysis module) in communication with the detector 1020 can receive the detected time-varying signal and operate on that signal to generate a mass spectrum associated with the detected ions. More specifically, in this embodiment, the analyzer 1022 can obtain a Fourier transform of the detected time-varying signal to generate a frequency-domain signal. The analyzer can then convert the frequency domain signal into a mass spectrum using the relationships between the Mathieu a- and q-parameters and m/z.

$$a_x = -a_y = \frac{8zU}{\Omega^2 r_0^2 m} \quad \text{Eq. (4)}$$

$$q_x = -q_y = \frac{4zV}{\Omega^2 r_0^2 m} \quad \text{Eq. (5)}$$

where z is the charge on the ion, U is the DC voltage on the rods, V is the RF voltage amplitude, Ω is the angular frequency of the RF, and $r_0$ is the characteristic dimension of the quadrupole. The radial coordinate r is given by $$r^2 = x^2 + y^2 \quad \text{Eq. (6)}$$

In addition, when q<~0.4 the parameter β is given by the $$\beta^2 = a + \frac{q^2}{2} \quad \text{Eq. (7)}$$

and the fundamental secular frequency is given by $$\omega = \frac{\beta\Omega}{2} \quad \text{Eq. (8)}$$

Under the condition where a=0 and q<~0.4, the secular frequency is related to m/z by the approximate relationship below.

$$\frac{m}{z} \sim \frac{2}{\sqrt{2}} \frac{V}{\omega \Omega r_0^2} \quad \text{Eq. (9)}$$

The exact value of β is a continuing fraction expression in terms of the a- and q-Mathieu parameters. This continuing fraction expression can be found in the reference J. Mass Spectrom. Vol 32, 351-369 (1997), which is herein incorporated by reference in its entirety.

The relationship between m/z and secular frequency can alternatively be determined through fitting a set of frequencies to the equation $$\frac{m}{z} = \frac{A}{\omega} + B \quad \text{Eq. (10)}$$

where, A and B are constants to be determined.

In some embodiments, a mass analyzer according to the present teachings can be employed to generate mass spectra with a resolution that depends on the length of the time varying excited ion signal, but the resolution can be typically in a range of about 100 to about 1000.

Figure 6:
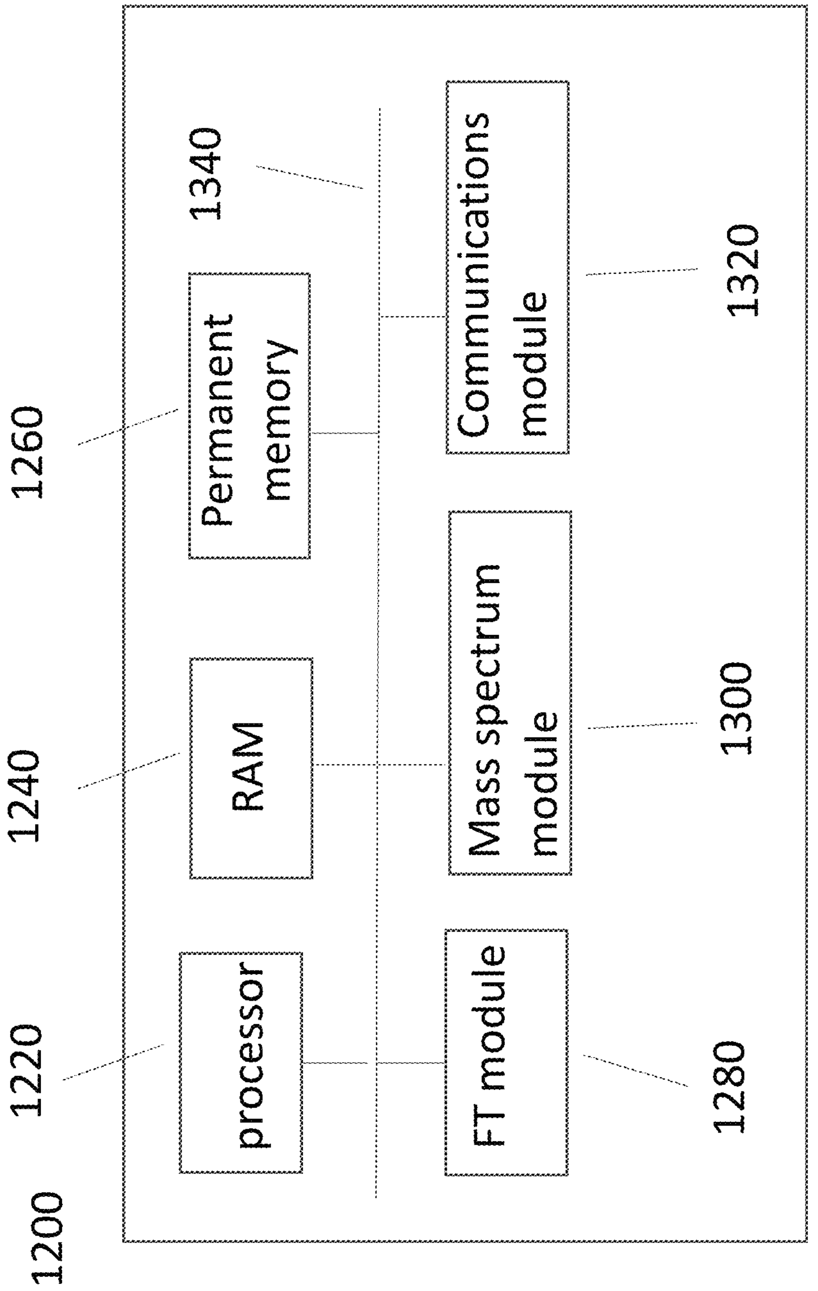

The controller 1010 and the analyzer 1022 can be implemented in hardware and/or software in a variety of different ways. By way of example, FIG. 6 schematically depicts an embodiment of the analyzer 1200, which includes a processor 1220 for controlling the operation of the analyzer. The exemplary analyzer 1200 further includes a random-access memory (RAM) 1240 and a permanent memory 1260 for storing instructions and data. The analyzer 1200 also includes a Fourier transform (FT) module 1280 for operating on the time-varying ion signal received from the detector 1180 (e.g., via Fourier transform) to generate a frequency domain signal, and a module 1300 for calculating the mass spectrum of the detected ions based on the frequency domain signal. A communications module 1320 allows the analyzer to communicate with the detector 1180, e.g., to receive the detected ion signal. A communications bus 1340 allows various components of the analyzer to communicate with one another. Although the controller 1010 and the analyzer 1022 are shown herein as two separate components, in some embodiments, the functionalities of the controller 1010 and the analyzer 1022 can be integrated into a single component.

Figure 7A:
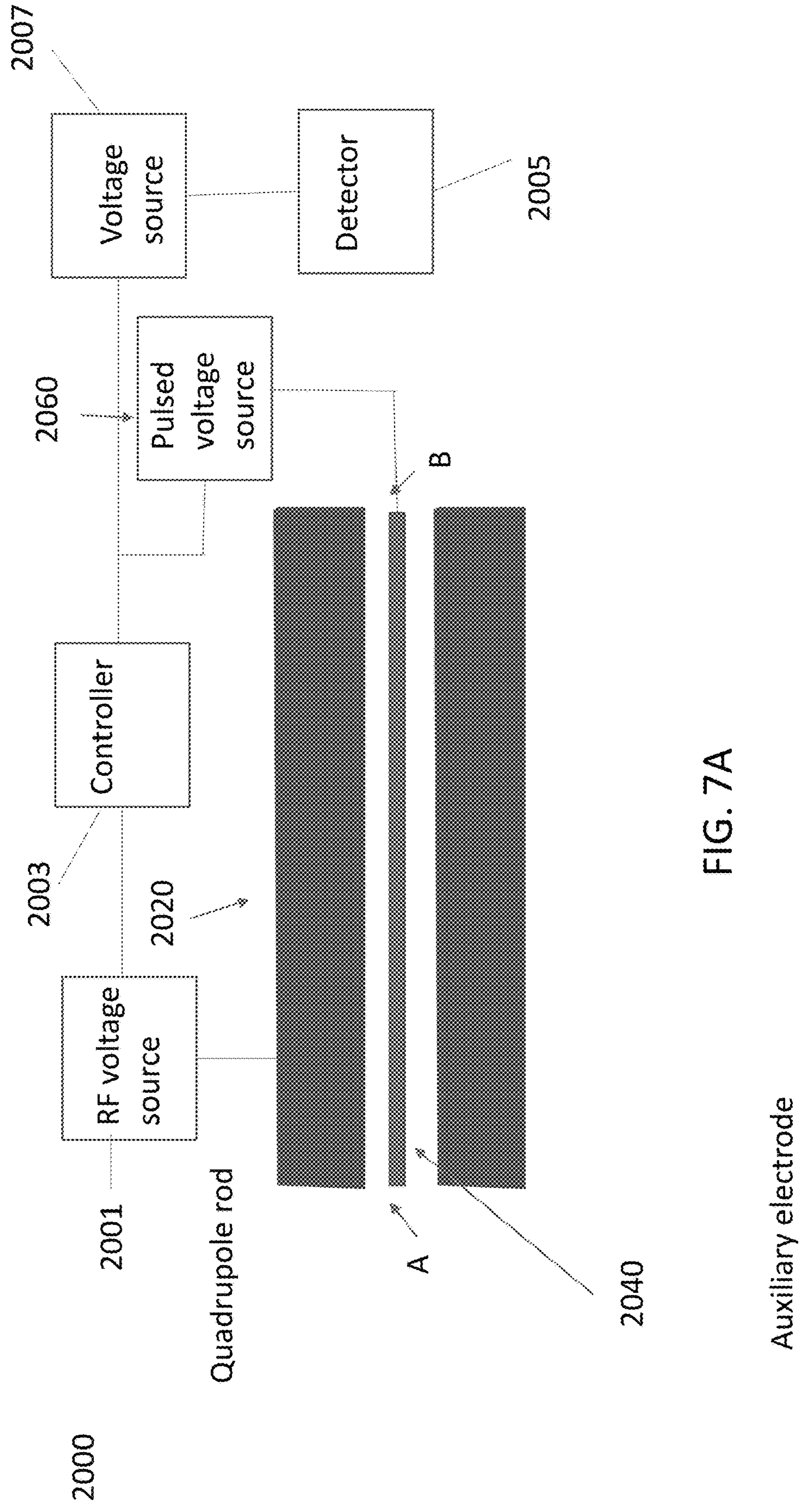
FIG. 7A is a side schematic view of a mass analyzer according to an embodiment in which the mass analyzer includes four quadrupole rods and four auxiliary rods.
Figure 7B:
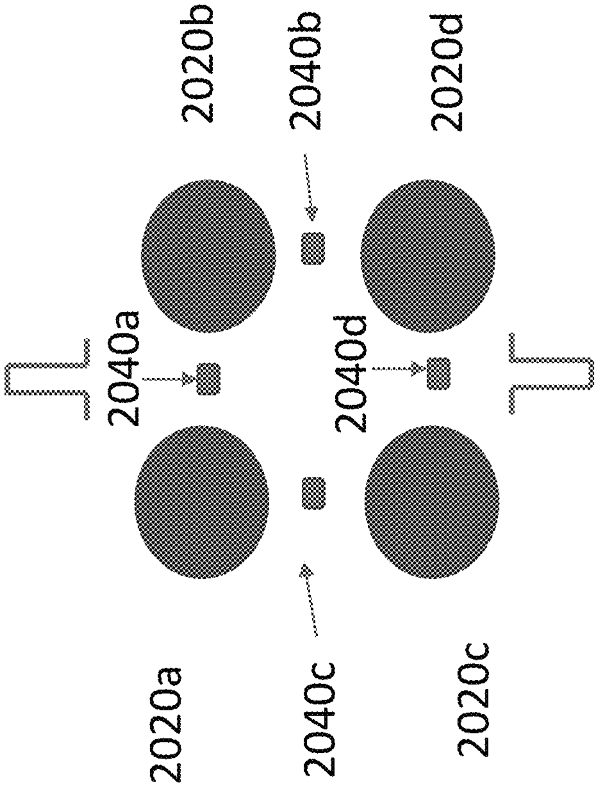
FIG. 7B is an end view of the mass analyzer depicted in FIG. 7A.

In some embodiments, a mass analyzer according to the present teachings can include a quadrupole rod set as well as one or more auxiliary electrodes to which an excitation voltage pulse can be applied for radial excitation of the ions within the quadrupole. By way of example, FIGS. 7A and 7B schematically depict a mass analyzer 2000 according to such an embodiment, which includes a quadrupole rod set 2020 composed of four rods 2020*a*, 2020*b*, 2020*c*, and 202*d* (herein collectively referred to as quadrupole rods 2020). In this embodiment, the analyzer 2000 further includes a plurality of auxiliary electrodes 2040*a*, 2040*b*, 2040*c* and 2040*d* (herein collectively referred to as auxiliary electrodes 2040), which are interspersed between the quadrupole rods 2020. Similar to the quadrupole rods 2020, the auxiliary electrodes 2040 extend from an input end (A) of the quadrupole to an output end (B) thereof. In this embodiment, the auxiliary electrodes 2040 have substantially similar lengths as the quadrupole rods 2020, though in other embodiments they can have different lengths.

Similar to the previous embodiment, RF voltages can be applied to the quadrupole rods 2020, e.g., via an RF voltage source 2001 for radial confinement of the ions passing therethrough. Rather than applying a voltage pulse to one or more of the quadrupole rods, in this embodiment, a voltage pulse can be applied to one or more of the auxiliary electrodes to cause radial excitation of at least some of the ions passing through the quadrupole. By way of example, in this embodiment, an excitation pulsed voltage source 2060 can apply a dipolar voltage pulse to the rods 2040*a* and 2040*d* (e.g., a positive voltage to the rod 2040*a* and a negative voltage to the rod 2040*d*).

Similar to the previous embodiment, a controller 2003 can configure the RF voltage source 2001 and the excitation pulsed voltage source 2060 such that signals generated thereby are phase locked relative to one another (e.g., the timing of the excitation voltage can be configured relative to the cycles of the RF voltage such that in each scan, the excitation voltage is applied to the auxiliary electrode(s) at the same time during the applied drive RF voltage).

As discussed above, the excitation voltage pulse can cause radial excitation of at least some of the ions passing through the quadrupole. The interaction of the radially excited ions with the fringing fields in proximity of the output end of the quadrupole can convert the radial oscillations of the ions to axial oscillations, and the axially oscillating ions can be detected by a detector 2005. A voltage source 2007 operating under control of the controller 2003 applies a data acquisition trigger to a digitizer (data acquisition system), which is coupled to the detector 2005 (e.g., an electron multiplier) to initiate the detection of the ions incident on the detector. In this embodiment, the controller configures the voltage source such that the trigger signal applied to the detector is phase locked relative to the RF signal as well as the excitation voltage signal. As noted above, such phase locking of these signals provides certain advantages, e.g., an increased signal-to-noise ratio.

Similar to the previous embodiment, an analyzer, such as the analyzer 1200 discussed above, can operate on a time-varying ion signal generated as a result of the detection of the axially oscillating ions to generate a frequency domain signal and can operate on the frequency domain signal to generate a mass spectrum of the detected ions.

Figure 8:
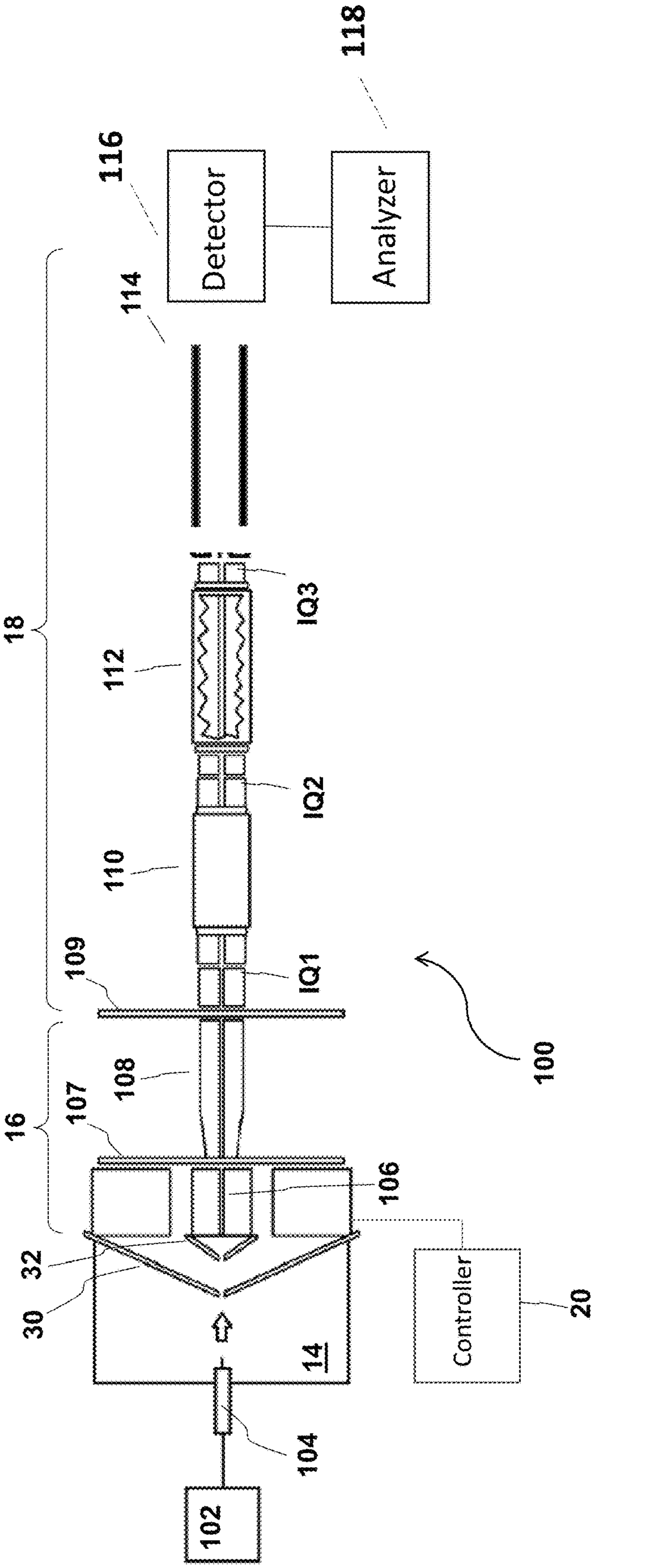
FIG. 8 is a schematic view of a mass spectrometer in which a rod set (e.g., a quadrupole rod set) according to the present teachings is incorporated.

A mass analyzer according to the present teachings can be incorporated in a variety of different mass spectrometers. By way of example, FIG. 8 schematically depicts such a mass spectrometer 100, which comprises an ion source 104 for generating ions within an ionization chamber 14, an upstream section 16 for initial processing of ions received therefrom, and a downstream section 18 containing one or more mass analyzers, collision cell and a mass analyzer 116 according to the present teachings.

Ions generated by the ion source 104 can be successively transmitted through the elements of the upstream section 16 (e.g., curtain plate 30, orifice plate 32, Qjet 106, and Q0 108) to result in a narrow and highly focused ion beam (e.g., in the z-direction along the central longitudinal axis) for further mass analysis within the high vacuum downstream portion 18. In the depicted embodiment, the ionization chamber 14 can be maintained at an atmospheric pressure, though in some embodiments, the ionization chamber 14 can be evacuated to a pressure lower than atmospheric pressure. The curtain chamber (i.e., the space between curtain plate 30 and orifice plate 32) can also be maintained at an elevated pressure (e.g., about atmospheric pressure, a pressure greater than the upstream section 16), while the upstream section 16, and downstream section 18 can be maintained at one or more selected pressures (e.g., the same or different sub-atmospheric pressures, a pressure lower than the ionization chamber) by evacuation through one or more vacuum pump ports (not shown). The upstream section 16 of the mass spectrometer system 100 is typically maintained at one or more elevated pressures relative to the various pressure regions of the downstream section 18, which typically operate at reduced pressures so as to promote tight focusing and control of ion movement.

The ionization chamber 14, within which analytes contained within the fluid sample discharged from the ion source 104 can be ionized, is separated from a gas curtain chamber by a curtain plate 30 defining a curtain plate aperture in fluid communication with the upstream section via the sampling orifice of an orifice plate 32. In accordance with various aspects of the present teachings, a curtain gas supply can provide a curtain gas flow (e.g., of $N_2$) between the curtain plate 30 and orifice plate 32 to aid in keeping the downstream section of the mass spectrometer system clean by declustering and evacuating large neutral particles. By way of example, a portion of the curtain gas can flow out of the curtain plate aperture into the ionization chamber 14, thereby preventing the entry of droplets through the curtain plate aperture.

As discussed in detail below, the mass spectrometer system 100 also includes a power supply and can further include, in some embodiments, additional controllers (not shown) that can be coupled to the various components so as to operate the mass spectrometer system 100 in accordance with various aspects of the present teachings.

As shown, the depicted system 100 includes a sample source 102 configured to provide a fluid sample to the ion source 104. The sample source 102 can be any suitable sample inlet system known to one of skill in the art and can be configured to contain and/or introduce a sample (e.g., a liquid sample containing or suspected of containing an analyte of interest) to the ion source 104. The sample source 102 can be fluidly coupled to the ion source so as to transmit a liquid sample to the ion source 102 (e.g., through one or more conduits, channels, tubing, pipes, capillary tubes, etc.) from a reservoir of the sample to be analyzed, from an in-line liquid chromatography (LC) column, from a capillary electrophoresis (CE) instrument, or an input port through which the sample can be injected, all by way of non-limiting examples. In some aspects, the sample source 102 can comprise an infusion pump (e.g., a syringe or LC pump) for continuously flowing a liquid carrier to the ion source 104, while a plug of sample can be intermittently injected into the liquid carrier.

The ion source 104 can have a variety of configurations but is generally configured to generate ions from analytes contained within a sample (e.g., a fluid sample that is received from the sample source 102). In this embodiment, the ion source 104 comprises an electrospray electrode, which can comprise a capillary fluidly coupled to the sample source 102 and which terminates in an outlet end that at least partially extends into the ionization chamber 14 to discharge the liquid sample therein. As will be appreciated by a person skilled in the art in light of the present teachings, the outlet end of the electrospray electrode can atomize, aerosolize, nebulize, or otherwise discharge (e.g., spray with a nozzle) the liquid sample into the ionization chamber 14 to form a sample plume comprising a plurality of micro-droplets generally directed toward (e.g., in the vicinity of) the curtain plate aperture. As is known in the art, analytes contained within the micro-droplets can be ionized (i.e., charged) by the ion source 104, for example, as the sample plume is generated. In some aspects, the outlet end of the electrospray electrode can be made of a conductive material and electrically coupled to a power supply (e.g., voltage source) operatively coupled to the controller 20 such that as fluid within the micro-droplets contained within the sample plume evaporate during desolvation in the ionization chamber 12, bare charged analyte ions or solvated ions are released and drawn toward and through the curtain plate aperture. In some alternative aspects, the discharge end of the sprayer can be non-conductive and spray charging can occur through a conductive union or junction to apply high voltage to the liquid stream (e.g., upstream of the capillary). Though the ion source 104 is generally described herein as an electrospray electrode, it should be appreciated that any number of different ionization techniques known in the art for ionizing analytes within a sample and modified in accordance with the present teachings can be utilized as the ion source 104. By way of non-limiting example, the ion source 104 can be an electrospray ionization device, a nebulizer assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ion source, DESI, among others. It will be appreciated that the ion source 102 can be disposed orthogonally relative to the curtain plate aperture and the ion path axis such that the plume discharged from the ion source 104 is also generally directed across the face of the curtain plate aperture such that liquid droplets and/or large neutral molecules that are not drawn into the curtain chamber can be removed from the ionization chamber 14 so as to prevent accumulation and/or recirculation of the potential contaminants within the ionization chamber. In various aspects, a nebulizer gas can also be provided (e.g., about the discharge end of the ion source 102) to prevent the accumulation of droplets on the sprayer tip and/or direct the sample plume in the direction of the curtain plate aperture.

In some embodiments, upon passing through the orifice plate 32, the ions can traverse one or more additional vacuum chambers and/or quadrupoles (e.g., a QJet® quadrupole) to provide additional focusing of and finer control over the ion beam using a combination of gas dynamics and radio frequency fields prior to being transmitted into the downstream high-vacuum section 18. In accordance with various aspects of the present teachings, it will also be appreciated that the exemplary ion guides described herein can be disposed in a variety of front-end locations of mass spectrometer systems. By way of non-limiting example, the ion guide 108 can serve in the conventional role of a QJet® ion guide (e.g., operated at a pressure of about 1-10 Torr), as a conventional Q0 focusing ion guide (e.g., operated at a pressure of about 3-15 mTorr) preceded by a QJet® ion guide, as a combined Q0 focusing ion guide and QJet® ion guide (e.g., operated at a pressure of about 3-15 mTorr), or as an intermediate device between a QJet® ion guide and Q0 (e.g., operated at a pressure in the 100s of mTorrs, at a pressure between a typical QJet® ion guide and a typical Q0 focusing ion guide).

As shown, the upstream section 16 of system 100 is separated from the curtain chamber via orifice plate 32 and generally comprises a first RF ion guide 106 (e.g., Qjet® of SCIEX) and a second RF guide 108 (e.g., Q0). In some exemplary aspects, the first RF ion guide 106 can be used to capture and focus ions using a combination of gas dynamics and radio frequency fields. By way of example, ions can be transmitted through the sampling orifice, where a vacuum expansion occurs as a result of the pressure differential between the chambers on either side of the orifice plate 32. By way of non-limiting example, the pressure in the region of the first RF ion guide can be maintained at about 2.5 Torr pressure. The Qjet 106 transfers ions received thereby to subsequent ion optics such as the Q0 RF ion guide 108 through the ion lens IQ0 107 disposed therebetween. The Q0 RF ion guide 108 transports ions through an intermediate pressure region (e.g., in a range of about 1 mTorr to about 10 mTorr) and delivers ions through the IQ1 lens 109 to the downstream section 18 of system 100.

The downstream section 18 of system 100 generally comprises a high vacuum chamber containing the one or more mass analyzers for further processing of the ions transmitted from the upstream section 16. As shown in FIG. 5, the exemplary downstream section 18 includes a mass analyzer 110 (e.g., elongated rod set Q1) and a second elongated rod set 112 (e.g., q2) that can be operated as a collision cell. The downstream section further includes a mass analyzer 114 according to the present teachings.

Mass analyzer 110 and collision cell 112 are separated by orifice plates IQ2, and collision cell 112 and the mass analyzer 114 are separated by orifice plate IQ3. For example, after being transmitted from 108 Q0 through the exit aperture of the lens 109 IQ1, ions can enter the adjacent quadrupole rod set 110 (Q1), which can be situated in a vacuum chamber that can be evacuated to a pressure that can be maintained at a value lower than that of chamber in which RF ion guide 107 is disposed.

By way of non-limiting example, the vacuum chamber containing Q1 can be maintained at a pressure less than about $1\times10^{-4}$ Torr (e.g., about $5\times10^{-5}$ Torr), though other pressures can be used for this or for other purposes. As will be appreciated by a person of skill in the art, the quadrupole rod set Q1 can be operated as a conventional transmission RF/DC quadrupole mass filter that can be operated to select an ion of interest and/or a range of ions of interest. By way of example, the quadrupole rod set Q1 can be provided with RF/DC voltages suitable for operation in a mass-resolving mode. As should be appreciated, taking the physical and electrical properties of Q1 into account, parameters for an applied RF and DC voltage can be selected so that Q1 establishes a transmission window of chosen m/z ratios, such that these ions can traverse Q1 largely unperturbed. Ions having m/z ratios falling outside the window, however, do not attain stable trajectories within the quadrupole and can be prevented from traversing the quadrupole rod set Q1. It should be appreciated that this mode of operation is but one possible mode of operation for Q1.

Ions passing through the quadrupole rod set Q1 can pass through the lens IQ2 and into the adjacent quadrupole rod set q2, which can be disposed in a pressurized compartment and can be configured to operate as a collision cell at a pressure approximately in the range of from about 1 mTorr to about 10 mTorr, though other pressures can be used for this or for other purposes. A suitable collision gas (e.g., nitrogen, argon, helium, etc.) can be provided by way of a gas inlet (not shown) to thermalize and/or fragment ions in the ion beam.

In this embodiment, the ions exiting the collision cell 112 can be received by the mass analyzer 114 according to the present teachings. As discussed above, the mass analyzer 114 can be implemented as a quadrupole mass analyzer with or without auxiliary electrodes. The application of RF voltages to the quadrupole rods (with or without a selectable resolving DC voltage) can provide radial confinement of the ions as they pass through the quadrupole and the application of a DC voltage pulse to one or more of the RF rods or the auxiliary electrodes can cause radial excitation of at least a portion (and preferably all) of the ions. As discussed above, the interaction of the radially excited ions with the fringing fields as they exit the quadrupole can convert the radial excitation of at least some of the ions into axial excitation. The ions are then detected by a detector 118, which generates a time-varying ion signal. An analyzer 120 in communication with the detector 118 can operate on the time-varying ion signal to derive a mass spectrum of the detected ions in a manner discussed above.

Figure 14:
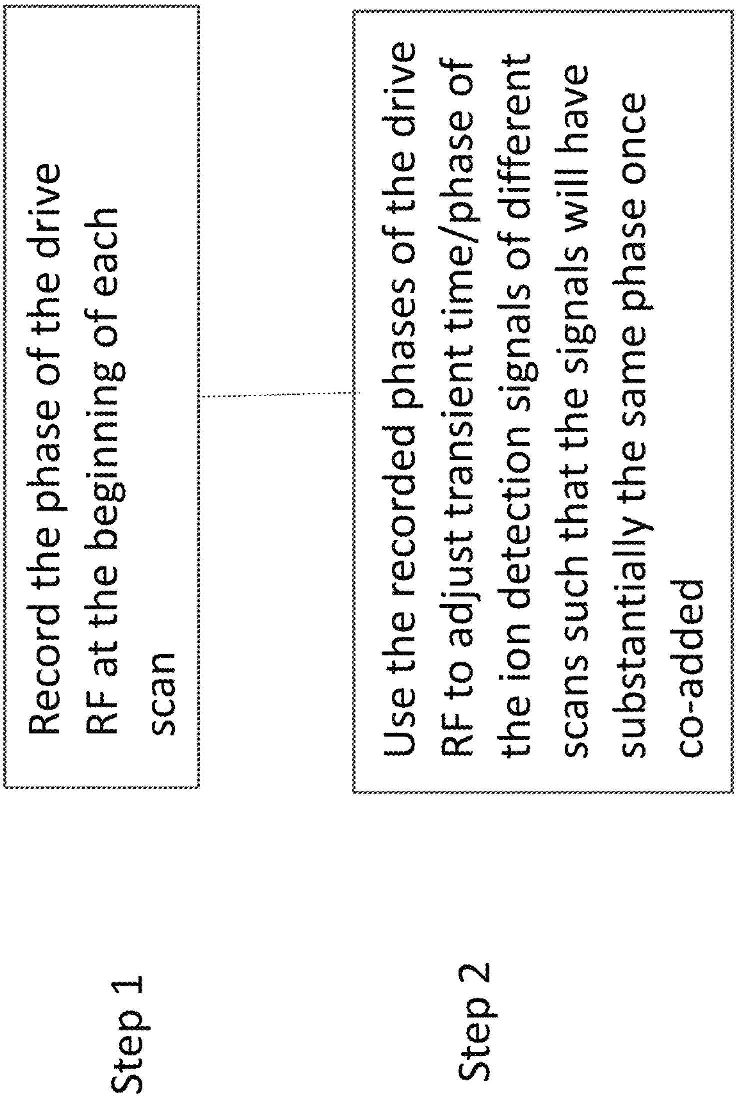
FIG. 14 is a flow depicting various steps in a method for phase locking a drive RF signal, an excitation signal, and a detection signal applied to a rod set in a mass spectrometer according to an embodiment of the present teachings, and FIG. 15 schematically depicts a system according to an embodiment for performing radial fragmentation of ions.

With reference to the flow chart of FIG. 14, in some embodiments, a method for phase locking a drive RF signal with an excitation signal applied to a quadrupole rod set of a Fourier transform spectrometer as well as a data acquisition signal applied a detector of the spectrometer can include recording the phase of the drive RF signal at the beginning of each scan (step 1). The phase of the ion detection signals can then be adjusted (step 2), e.g., in software, such that all scans have substantially the same phase once co-added.

Accordingly, phase locking the RF, excitation, and detection signals can result in the generation of spectra with higher signal-to-noise ratio, thereby reducing the number of averages required. In some embodiments, in conjunction with a radial fragmentation technique (e.g., via laser pointed down the ion optical axis), the detected micromotion information, or known RF phase, can be used to determine the precise timing of ion fragmentation events such that the fragmentation efficiency for a species of interest is maximized. Among other parameters, such as the resolving DC, ion energy, excitation voltage, etc., the instantaneous magnitude of an ion's radial displacement from the quadrupole axis is a function of the ion's inherent m/z, and the applied RF. In other words, the ion trajectory is a superposition of the secular motion and RF-induced micromotion. By knowing the RF phase at every time point, ion fragmentation can be performed when there is maximal overlap between the radial fragmentation technique, e.g. laser, and ion cloud.

Figure 15:
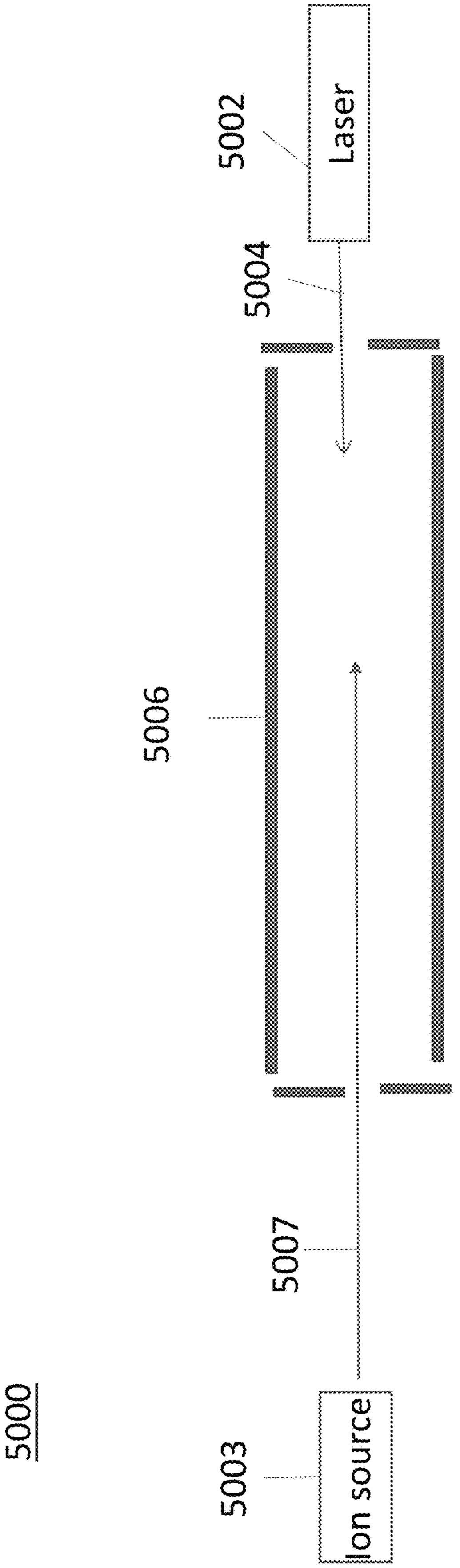

By way of example, FIG. 15 schematically depicts a system 5000 for performing such ion fragmentation, which includes a laser source 5002 providing a laser radiation beam 5004 that is pointed along the longitudinal axis of a quadrupole rod set 5006, which can be configured as a linear ion trap (LIT). An ion source 5003 delivers a plurality of ions 5007 into the LIT 5006. An RF drive voltage can preferentially excite some ion precursors to a large radius. The remaining precursor ions at lower radii (i.e., closer to the longitudinal axis of the quadrupole) can be fragmented via interaction with the laser radiation.

The following examples are provided for further elucidation of various aspects of the present teachings, and are not intended to necessarily provide the optimal ways of practicing the present teachings or the optimal results that can be obtained.

Example 1

Figure 9:
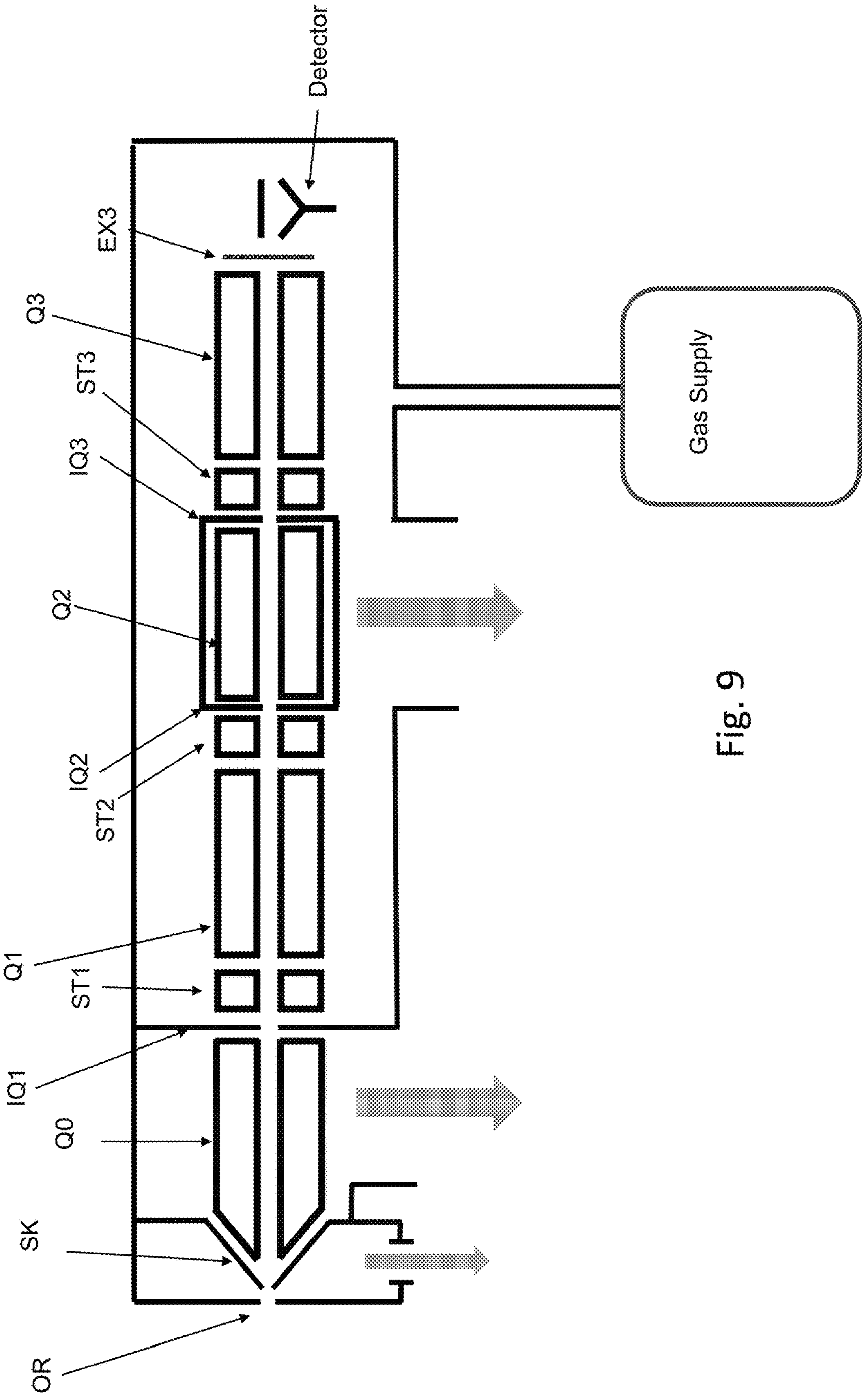
FIG. 9 is a schematic of an mass spectrometer used to acquire illustrative data.

A 4000 QTRAP® mass spectrometer marketed by Sciex (which is similar to that depicted in FIG. 9) was modified according to the present teachings. A waveform generator (a Keysight 33520B waveform generator) was used to the burst the clock of the drive RF of the mass analysis quadrupole (such as quadrupole Q3 in FIG. 9). The waveform generator was triggered at the beginning of the scan function and the number of cycles was adjusted such that the burst ended during the dump/reset segment of the scan, for approximately the last 100 microseconds of the scan function. The second channel of the waveform generator and the sync output were also set to burst and delayed relative to the trigger. Specifically, the ion excitation and data acquisition were triggered about 10.25 ms after the waveform generator was triggered. In this manner, the RF drive, the excitation, and the detection were all phase locked at the start of the mass analysis segment.

Figure 10:
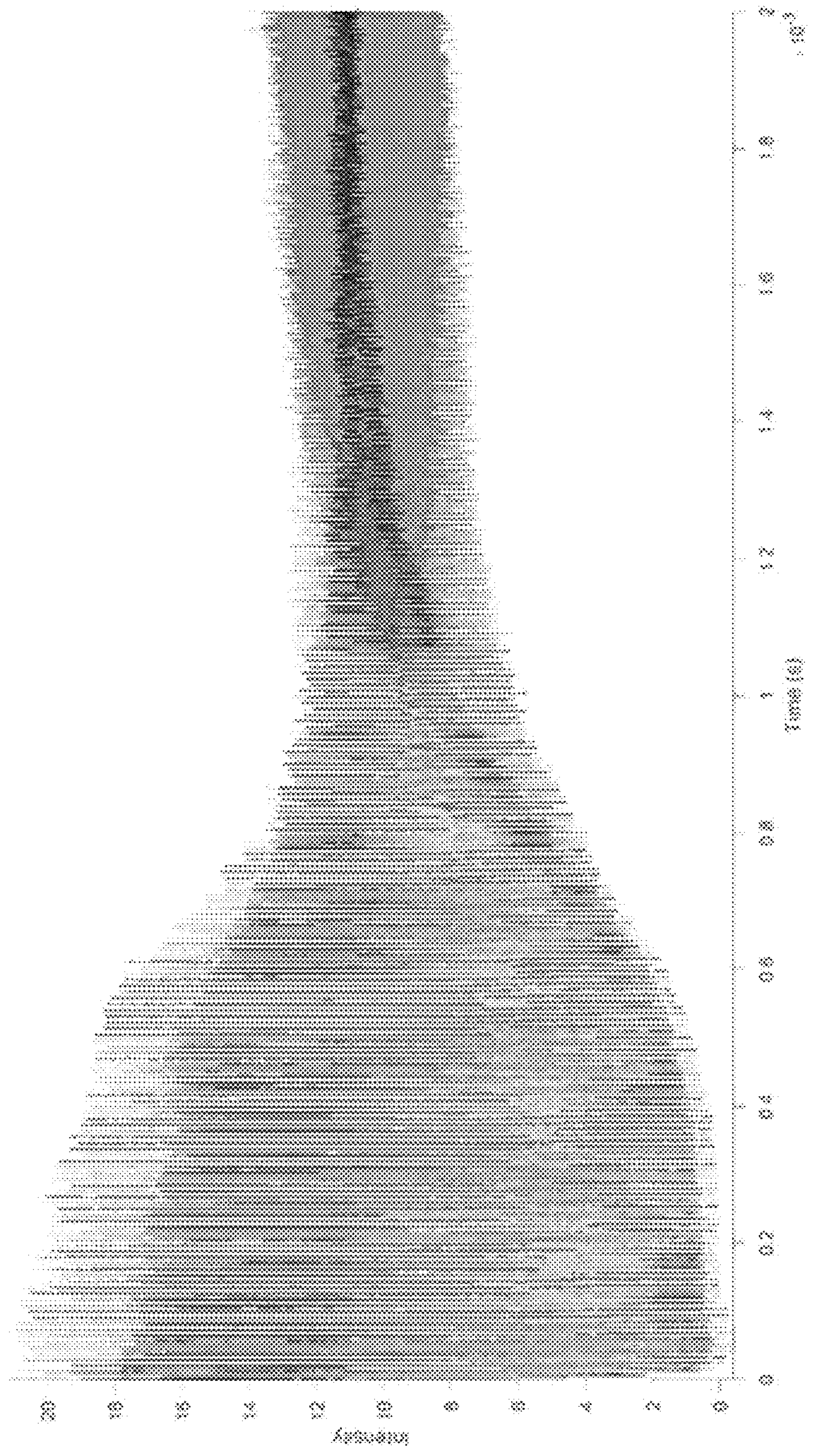
FIG. 10 depicts a full 2 ms transmission mode FT-LIT transient of resperine with (gray) and without (black) phase locking.
Figure 11:
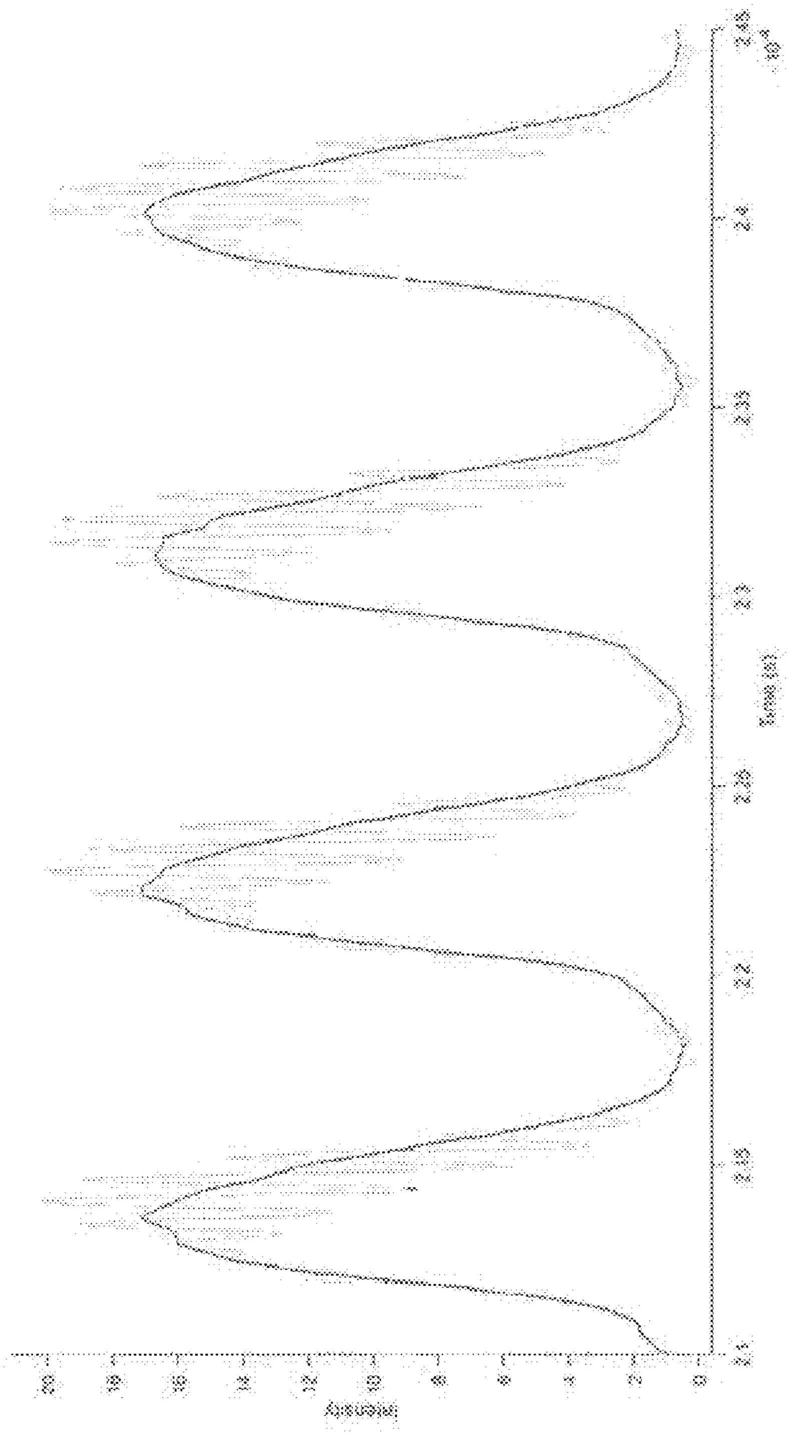
FIG. 11 is an expanded view of the transient shown in FIG. 10 at about 230 microseconds.

FIGS. 10 and 11 show the transmission mode FT-LIT transient signal of reserpine (1024 AVGs) with (gray trace) and without (black trace) phase locking, after spectral denoising. All other conditions were identical. In both traces, the low frequency fluctuation in ion intensity results from the secular motion of the ions. However, the gray scale (phase locked) clearly shows the RF micromotion of the ions trajectory.

In both cases, ion excitation and detection were triggered at the same time. As the secular motion of the ion packet is independent of the instantaneous phase of the RF drive, both traces overlap in time. However, when the drive RF and the ion detection signals are not phase locked, the time at which an ion is preferentially ejected, corresponding to the maxima of the RF induced micromotion, changes from scan to scan. Consequently, the high frequency signal oscillation averages itself out over the course of many scans, leading to the observation of a sinusoidal signal which is free of micromotion information. By phase locking the drive RF and excitation/detection, the times at which ions are preferentially ejected become consistent from scan to scan and the signal magnitude increases.

A Keysight 33520B waveform generator was used to burst the clock of a voltage exciter and amplifier for the Q3 quadrupole rod set. The waveform generator was triggered using a digital-to-analog output of an instrument controller at the beginning of the scan function. The one channel RF output of the waveform generator was applied to the quadrupole rods for generating a quadrupolar field and was turned off for approximately the last 100 microseconds of the scan function.

Example 2

Figure 12:
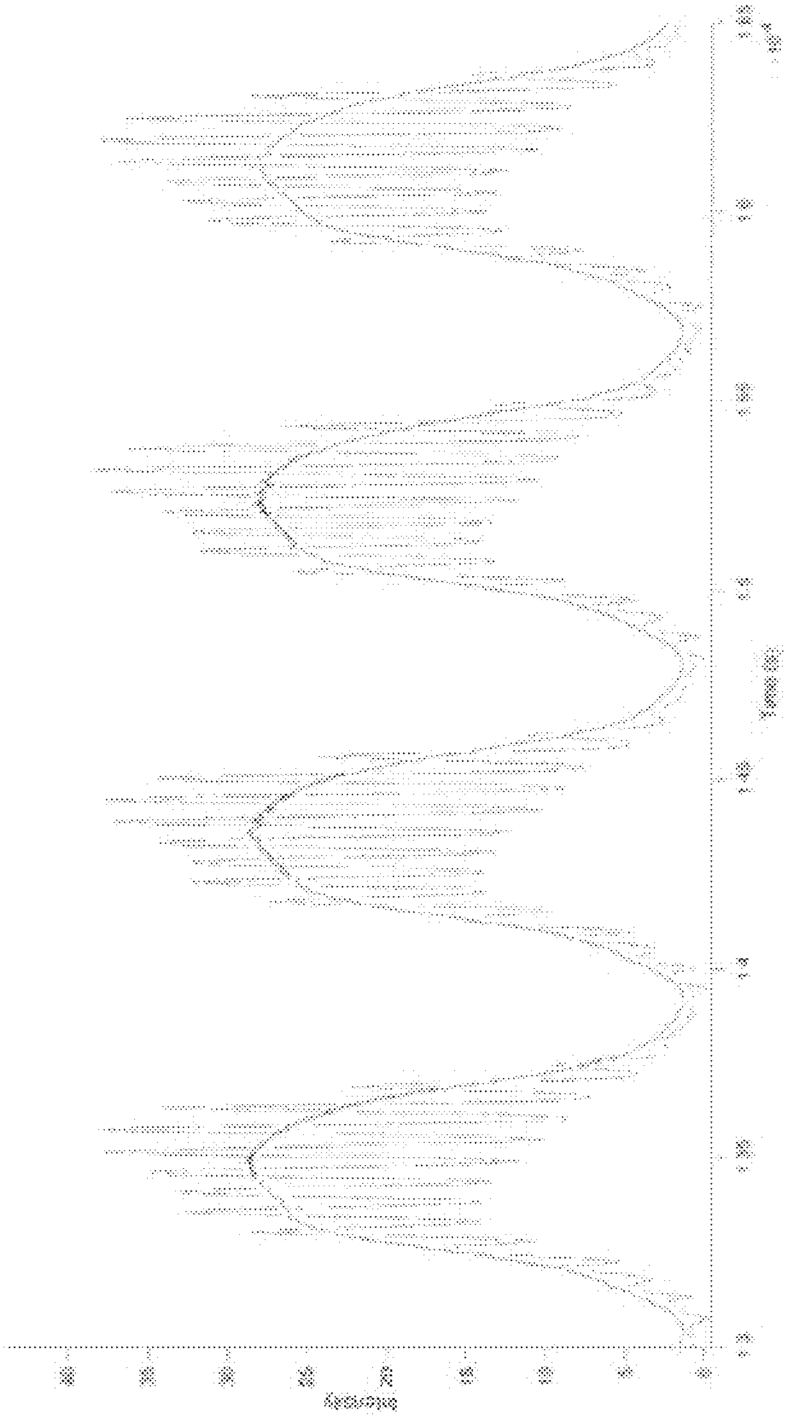
FIG. 12 is an expanded view of the transmission mode FT-LIT transient of resperine with (gray) and without (black) phase locking, where the kinetic energy of ions was less than the kinetic energy of ions associated with the data presented in FIG. 11.
Figure 13:
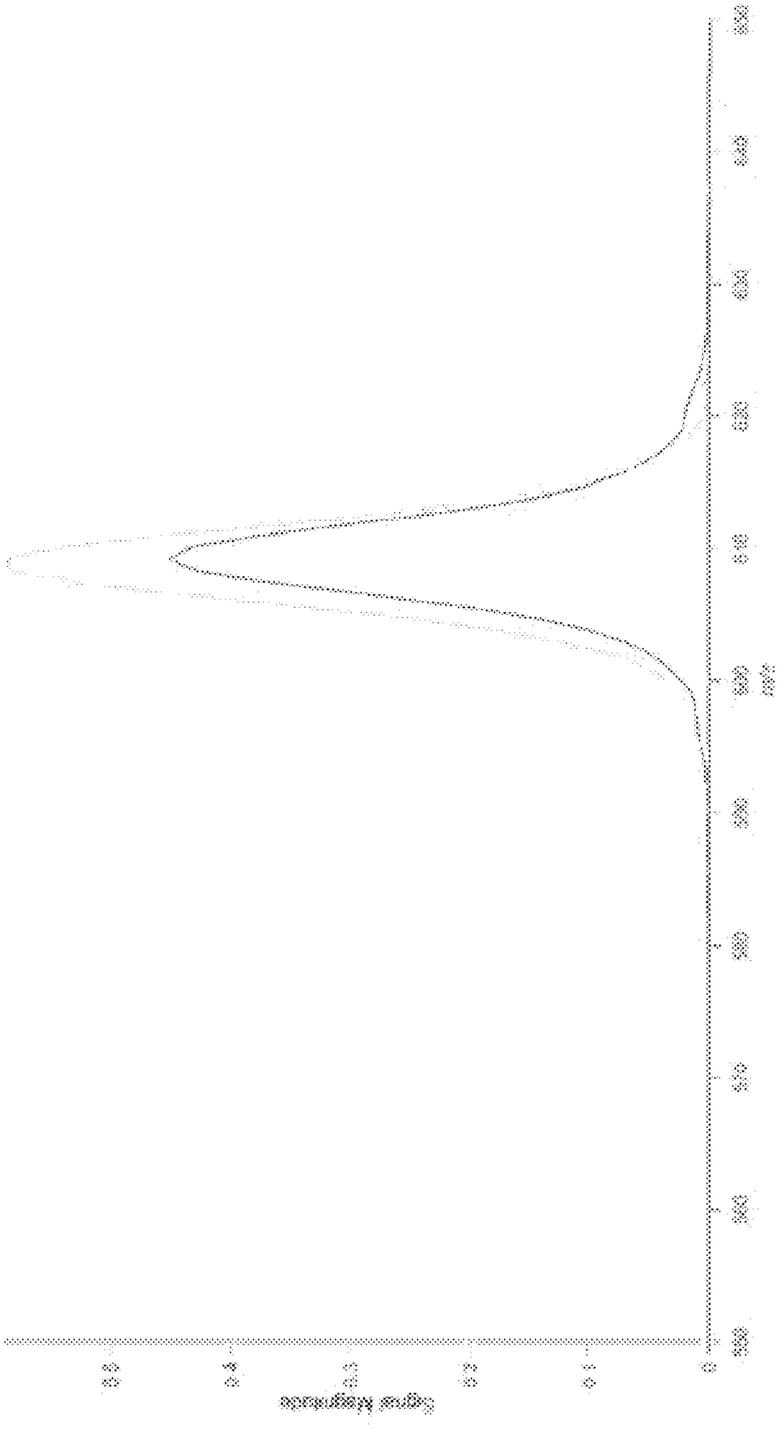
FIG. 13 shows mass spectra associated with the transients depicted in FIG. 12.

FIG. 12 shows transmission mode FT-LIT transients of reserpine with (gray trace) and without (black trace) phase locking and FIG. 13 depicts the corresponding mass spectra. The same mass spectrometer as that employed in the previous example was used except that the kinetic energy of the ions in the mass analysis quadrupole was reduced, thereby generating higher resolution micromotion information. Similar to the previous example, when the drive RF, excitation and detection signals are phase locked, the signal magnitude increases as the timing associated with the preferential ejection of ions is substantially identical from one scan to the next.

This data shows that the ion micromotions are visible in the transient obtained with phase locking and further shows that the magnitude of the mass signal corresponding to the transient obtained with phase locking is greater than the magnitude of the mass signal corresponding to the transient obtained without phase locking.

Those skilled in the art will appreciate that various changes can be made to the above embodiments without departing from the scope of the invention.

What is claimed is:

1. A mass analyzer, comprising:

a quadrupole having an input end for receiving ions and an output end through which ions can exit the quadrupole, said quadrupole having a plurality of rods to at least some of which an RF voltage can be applied for generating a quadrupolar field for causing radial confinement of the ions as they propagate through the quadrupole and further generating fringing fields in proximity of said output end, at least one voltage source for applying said RF confinement voltage to said rods, said at least one voltage source further being configured for applying an excitation signal to at least one of said rods for exciting radial oscillations of at least a portion of the ions passing through the quadrupole at secular frequencies thereof, wherein the radially-excited ions interact with the fringing fields to exit the quadrupole such that their radial oscillations are converted into axial oscillations, a detector for detecting said ions exiting the quadrupole in response to a data acquisition trigger provided by said at least one voltage source, a controller in communication with said at least one voltage source to configure said at least one voltage source such that said RF confinement voltage, said excitation signal and said data acquisition trigger signal are phase locked.

2. The mass analyzer of claim 1, wherein said excitation signal and said data acquisition trigger signal are applied substantially concurrently to said at least one of said rods and said detector, respectively.

3. The mass analyzer of claim 1, wherein said detector generates a time-varying signal in response to detection of said axially oscillating ions.

4. The mass analyzer of claim 3, further comprising an analysis module for receiving said time-varying signal and applying a Fourier Transform to said time-varying time signal so as to generate a frequency domain signal.

5. The mass analyzer of claim 4, wherein said analysis module operates on said frequency domain signal to generate a mass spectrum of said excited ions.

6. The mass analyzer of claim 5, wherein said excitation signal has a duration in a range of about 10 ns to about 1 millisecond.

7. The mass analyzer of claim 1, wherein said RF confinement voltage has a frequency in a range of about 50 kHz to about 10 MHz.

8. The mass analyzer of claim 7, wherein said RF confinement voltage has an amplitude in a range of about 50 V to about 10 kV.

9. The mass analyzer of claim 1, wherein said plurality of rods incudes four rods arranged so as to generate a quadrupolar field in response to application of the RF confinement voltage thereto.

10. The mass analyzer of claim 9, wherein said plurality of rods further includes at least a pair of auxiliary electrodes; and optionally wherein said at least one voltage source applies said excitation signal across said pair of the auxiliary electrodes.

11. The mass analyzer of claim 1, wherein said at least one voltage source comprises an RF voltage source for applying said RF confinement voltage and a pulsed voltage source for generating said oscillation signal and said data acquisition signal.

12. The mass analyzer of claim 1, wherein said quadrupole is a linear ion trap (LIT).

13. The mass analyzer of claim 12, further comprising an exit lens disposed in proximity of said output end of the linear ion trap.

14. The mass analyzer of claim 13, wherein said at least one voltage source is configured to apply a DC voltage to said exit lens so as to adjust said fringing fields in proximity of said output end of the linear ion trap.

15. A method of performing mass analysis, comprising:

passing a plurality of ions through a quadrupole comprising a plurality of rods, said quadrupole rod set comprising an input end for receiving the ions and an output end through which ions exit the quadrupole, applying at least one RF voltage to at least one of said rods so as to generate a field for radial confinement of the ions as they pass through the quadrupole, applying an excitation voltage pulse across at least one pair of said plurality of rods so as to excite radial oscillations of at least a portion of the ions passing through the quadrupole at secular frequencies thereof such that an interaction between said excited ions with fringing fields in proximity of said output end facilitates exit of said excited ions through said output end and converts said radial oscillations into axial oscillations as said excited ions exit the quadrupole set, wherein said RF voltage is phased locked relative to said voltage pulse.

16. The method of claim 15, further comprising a detector for detecting the ions exiting the quadrupole, said detector generating a time-varying ion detection signal.

17. The method of claim 16, further comprising applying a data acquisition trigger signal to said detector to initiate acquisition of ion detection signal; and optionally wherein said data acquisition trigger signal is phase locked relative to said RF voltage and said excitation voltage pulse.

18. The method of claim 17, further comprising obtaining a Fourier transform of said time-varying ion detection signal so as to generate a frequency-domain signal and utilizing said frequency-domain signal to generate a mass spectrum associated with the detected ions.

19. The method of claim 15, wherein said quadrupole is a linear ion trap.

20. A method of obtain mass detection signals in a mass spectrometer, comprising:

applying a drive RF signal to at least one rod of a quadrupole rod set for each of a plurality of scans for collecting mass signals of a plurality of ions, recording phase of the drive RF signal at the beginning of each scan, for each scan, obtaining transient ion detection signal, adjusting phase of each transient ion detection signal obtained in each scan based on the recorded phase of the drive RF signal for that scan such that all transient ion detections signals corresponding to said plurality of scans have substantially the same phase.

* * * * *